Sept. 29, 1970    A. McNAMEE    3,531,341
ELECTRIC CABLES

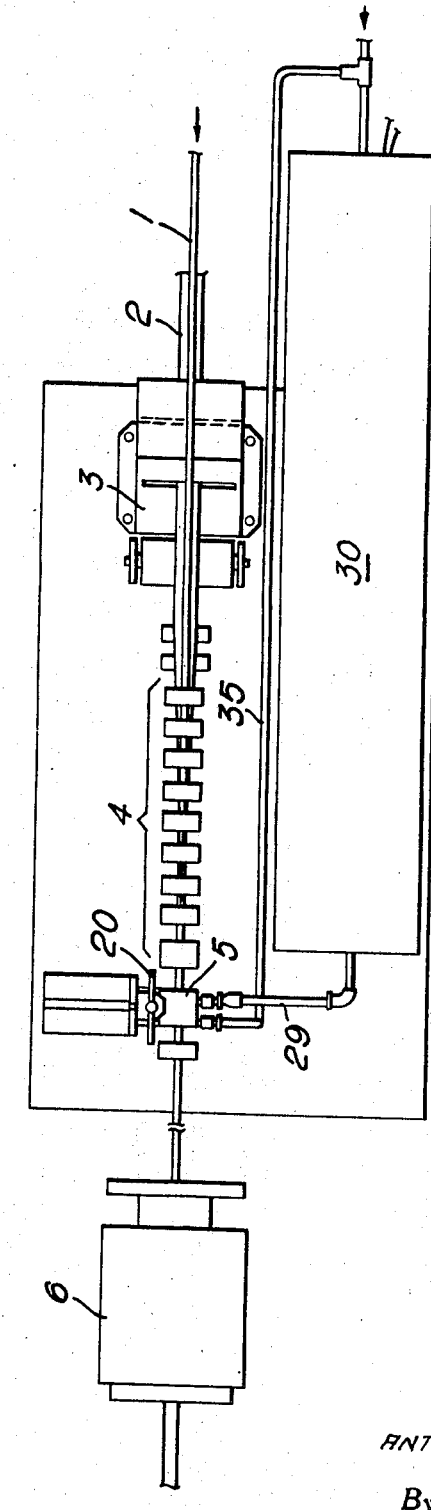

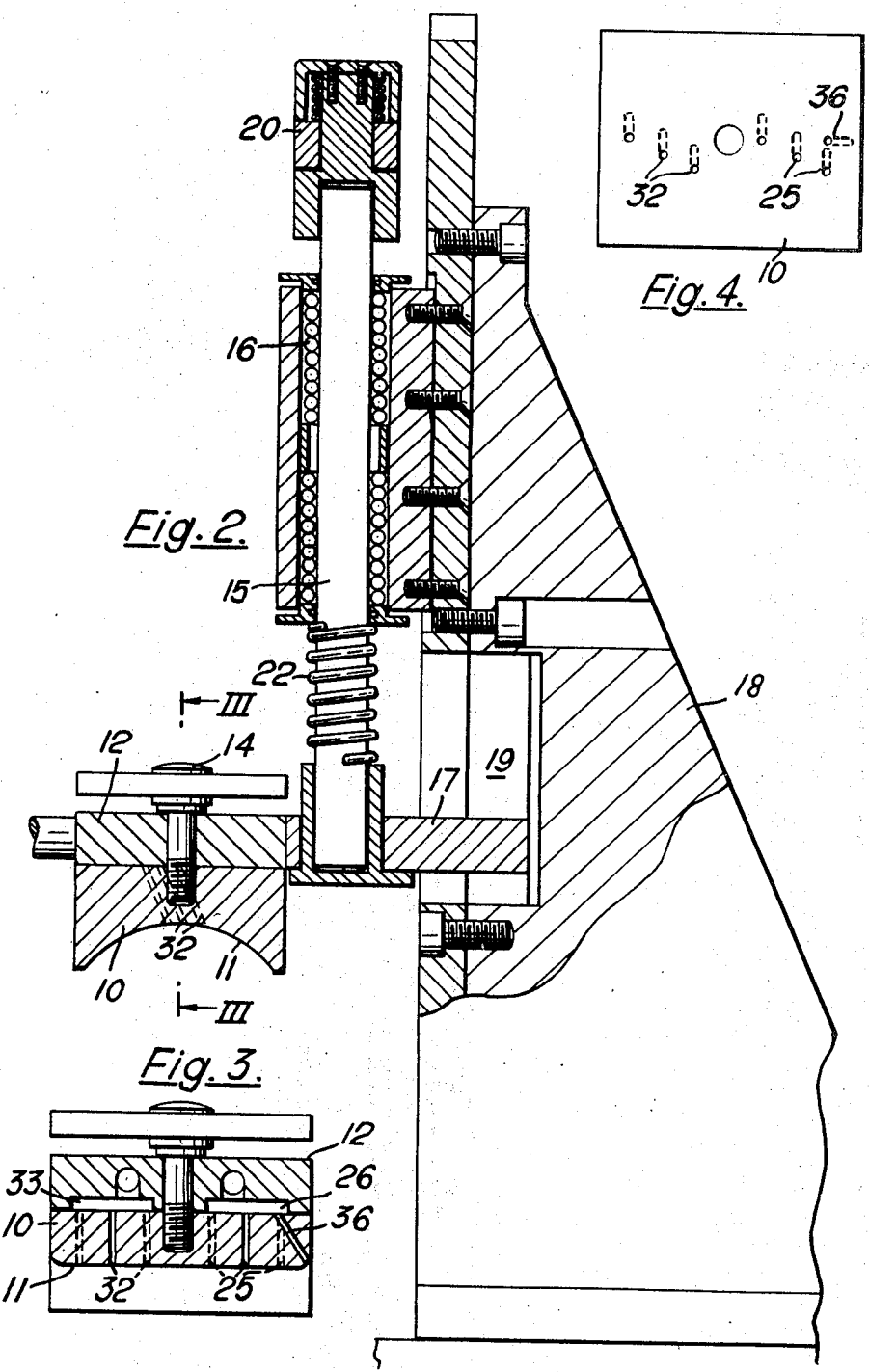

Filed Sept. 20, 1968    3 Sheets-Sheet 3

Inventor
ANTHONY MCNAMEE

By
Attorneys 3,531,341
ELECTRIC CABLES
Anthony McNamee, Prescot, England, assignor to British Insulated Callender's Cables Limited, London, England
Filed Sept. 20, 1968, Ser. No. 761,231
Claims priority, application Great Britain, Sept. 22, 1967, 43,307/67
Int. Cl. H01b 13/10, 13/24
U.S. Cl. 156—54
13 Claims

ABSTRACT OF THE DISCLOSURE

In a method of forming about a cable core a tubular conductor by drawing a thermoplastics coated metal foil tape and the cable core through a tape-folding device which bends the tape transversely to its length to embrace the cable core, a bond between a longitudinally extending strip of the folded tape and an underlying surface is obtained by simultaneously heating and pressing together the overlying strip and underlying surface by maintaining a film of a hot gaseous fluid under superatmospheric pressure in contact with at least that part of the outer surface of the strip of the coated metal foil tape that overlies and makes contact with the underlying surface. The film of hot gaseous fluid is maintained for a period of time sufficient for the thermoplastic material between the strip and the underlying surface to become sufficiently softened to enable the required bond to be effected.

---

The present invention relates to the manufacture of electric cables of the kind in which there is incorporated a longitudinally extending tape of metal foil having on at least one of its surfaces a coating of thermoplastic material. Such a tape may be inserted to serve as a moisture barrier inside a plastics sheath that is not completely impervious to the passage of moisture or it may be introduced to serve as a tubular or substantially tubular conductor or a screen or it may serve as both water barrier and a tubular conductor or screen. Where such a tape is to serve as a moisture barrier and has a coating of thermoplastic material on one surface only, the tape is so applied that its coating of thermoplastic material is on the outside of the tape covered core and the material of the coating is such that the coating will bond with the sheath wall, preferably by the application of heat arising from the extrusion of the plastics sheath. Where such a tape is to serve as a tubular conductor or screen surrounding an insulated conductor or group of insulated conductors, the coating of thermoplastic material may be on the opposite side of the tape so that the tape may become bonded by heat to the insulation of the insulated conductor or group of conductors. Where it is to be bonded both to the sheath and to the insulated conductor or conductors (or to a belt of insulation surrounding them) the tape will of course be coated on both sides with thermoplastic material.

In applying such coated metal foil tape longitudinally to an insulated conductor or conductors (hereinafter referred to as "cable core") before applying a plastics sheath thereto, the tape is drawn off a supply reel and advanced in the general direction of travel of the cable core. The tape and the cable core are then drawn through a tape-folding device which bends the tape transversely to its length around the cable core to embrace the entire or almost the entire circumference of the core. For most purposes, it is preferable for the width of the tape to exceed the circumference of the cable core so that the margins of the tape overlap. The taped core then passes into the extruder by which the plastics sheath is applied. As the folding device is necessarily spaced from the point of application of the plastics sheath to the longitudinally taped cable core there is a tendency for the folded tape to spring open or enlarge with the result that on application of the tightly fitting plastics sheath the tape becomes creased. This may be prevented by enshrouding the taped core in a closely fitting tubular die located adjacent the entry end of the inner die of the extruder or extending from the folding die to the extruder die but where the coating of thermoplastic material is on the outside of the taped core there is risk of the coating being stripped off the foil unless provision is made to force-cool this tubular die at least in the vicinity of the inner die of the extruder. Where the edges of the folded tape overlap one another they may be seamed together by passing them through a heated die or under a heated iron immediately after the taped cores leave the folding device. With this also there is risk of the external thermoplastic coating, if present, becoming stripped from the metal foil tape.

By the present invention a bond is obtained between a longitudinally extending strip of a longitudinally applied thermoplastics coated metal foil tape embracing a cable core and an underlying surface, by simultaneously heating and pressing the overlying strips on to the underlying surface by maintaining a film of a hot gaseous fluid under superatmospheric pressure in contact with at least that part of the outer surface of the strip of the coated metal foil tape that overlies and makes contact with the underlying surface for a period of time sufficing for the thermoplastic coating of the strip and/or of the underlying surface to become sufficiently softened to enable the required bond to be effected.

The underlying surface may be of a thermoplastic material compatible with that of the coated metal foil tape and may be a longitudinally extending strip of the surface of the cable core or, where the tape is applied with overlap, the surface of an underlying longitudinally extending strip of the coated tape. Preferably, the underlying surface is of the same thermoplastic material as that of the coated metal foil tape. Where, however, the tape is applied to the cable core with overlap and has a coating of thermoplastic material on one side only, the surface of the underlying longitudinally extending strip of the coated metal tape constituting the underlying surface may be the metal foil itself.

The bond may be effected by causing the tape-enveloped core to travel through or past a die and feeding hot gaseous fluid under superatmospheric pressure into a clearance between the taped core and the wall of the die. The film of hot gaseous fluid streaming between the die wall and the tape-enveloped cable core serves three purposes. It applies the requisite pressure to hold in contact the surfaces to be bonded together; secondly, it serves locally to melt the coating of thermoplastic medium and effect the required bond; thirdly, it acts as a lubricant between the tape-enveloped cable core and the wall of the die, so eliminating, or at least very substantially reducing, the risk of the die stripping, from the external surface of the tape-enveloped core heated, thermoplastic material, if present.

Solidification of the softened material between the overlying strip and the underlying surface is preferably accelerated by feeding into the downstream portion of the same die, or of a second die adjacent the exit end of the first die, cold gaseous fluid under pressure which solidifies the thermoplastic material after bonding and also further lubricates the cable in its passage through or past the die. By this means the metal foil tape envelope emerges from the sealing die at a temperature substantially the same as that at which the thermoplastics coated metal foil tape enters the bonding die.

In cases where the overlapping margins of a longitudinally applied thermoplastics coated metal foil tape are to be seam welded together at least the overlapping margins of an advancing tape-enveloped core may be caused to travel past, preferably under, a die having a die surface of substantially arcuate form, which die is so supported that it is urged towards the overlapping margins but is maintained in spaced relationship thereto by the hot gaseous fluid being used to heat and press together the overlapping margins of the tape. It may suffice to provide a single port in the wall of the die for the admission of hot gaseous fluid under pressure but it is preferred to provide a plurality of ports mutually spaced along the length of the die. These ports preferably open into the lower surface of the die at places directly over the overlapped margins and preferably comprise two or more arcuately spaced ports or groups of ports, each group of ports lying on a line extending parallel to the axis of the die. Each port is preferably inclined to the inward radial direction in such a manner that the flow of hot gaseous fluid moves over the top overlapping portion of tape in the direction of overlap. This in addition to melting the polyethylene layers also has the action of evacuating air from between the overlapped portions of the tape and assists in pressing them together to promote bonding.

In cases where a longitudinally applied plastics coated metal foil tape is applied to a cable core to which it is to be bonded, with the edges of the tape either abutting one another or with a slight gap, the tape is coated on the side next the cable core and two or more ports may be provided to direct streams of hot gaseous fluid to a corresponding number of strips of the applied tape, one or more to one side of the gap and one or more to the other side. In both cases at the entry end of the die an additional port or ports, preferably of smaller diameter, may be provided opening into the flared entry end of the die and so inclined to the axis of the die as to give a stream of fluid emerging at a high velocity a component of movement opposite to the direction of travel of the tape-enveloped core. This port ensures that a stream of hot fluid is always applied to the core even in the case when an irregularity in the tape-enveloped core momentarily blocks the main ports for the introduction of hot gaseous fluid.

Where the plastics coated metal foil is to be applied to a plastics insulated conductor to form the outer conductor of a coaxial cable the tape is preferably a copper tape coated on both surfaces with a thermoplastic insulating material, e.g. polythene, and the tape is welded to the external surface of the dielectric over substantially the whole surface of the dielectric. This may be done by passing the tape-enveloped cable core through a tubular die having either a ring or mutually spaced rings of ports around the circumference of the die or having one or more than one circumferentially continuous port in its wall, for the admission of hot air or gas under pressure. This form of port is advantageous from the point of view of securing a circumferentially complete film of gas between the foil-enveloped cable core and the tubular die wall. On this account it may also be used in cases where it is merely required to bond the overlapping edges of the tape together. As in the case of an arcuate die the ports may be inclined to the inward radial direction. The gas then exhausts through the ends of the die by a helical path which again assists in securing a circumferentially complete lubricating film of gas between the foil and the die.

The invention will now be described in more detail, and by way of example, with reference to the accompanying drawings, in which:

FIG. 1 is a diagrammatic plan view of the preferred form of apparatus for forming about a cable core a tubular conductor by drawing a thermoplastics coated metal foil tape and the cable core through a tape-folding device which bends the tape transversely to its length to embrace the cable core so that the margins of the tape overlap;

FIG. 2 is an end view, partly in section and partly in elevation, of the preferred form of apparatus for securing a bond between the overlapping margins of the tape;

FIG. 3 is a sectional view taken on the line III—III in FIG. 2;

FIG. 4 is a plan view of the die forming part of the bonding apparatus shown in FIG. 2;

Figure 5:
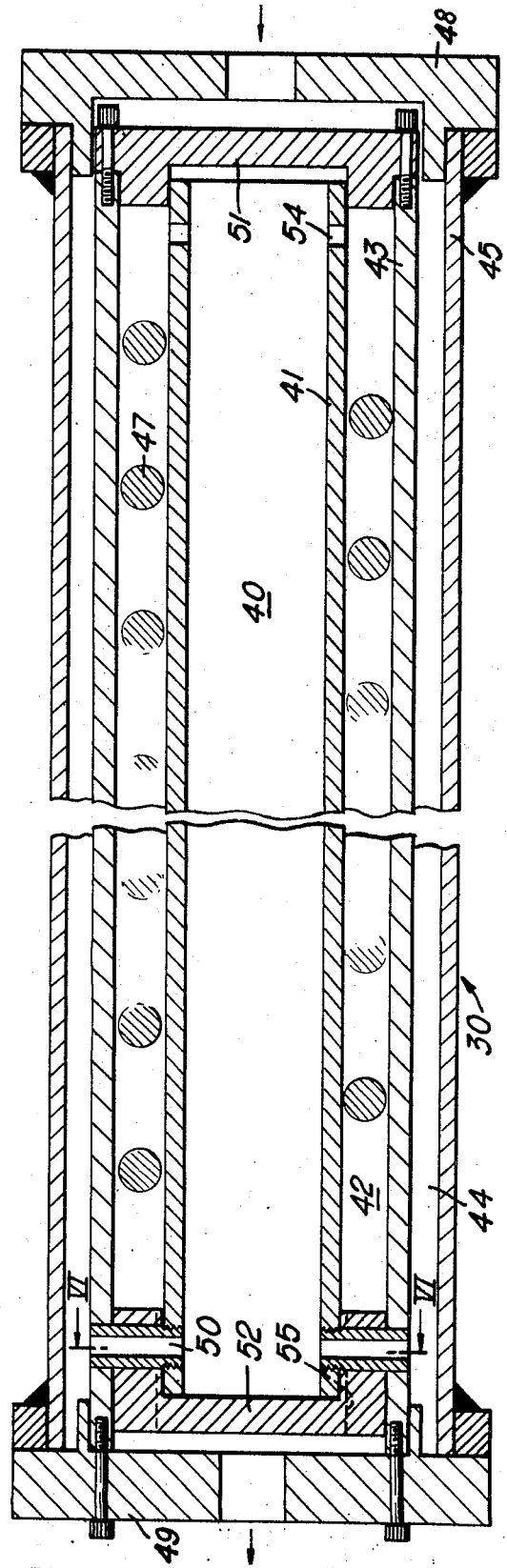
FIG. 5 is a sectional side elevation of the preferred form of device for heating the gaseous fluid to be fed to the apparatus shown in FIGS. 2, 3 and 4.

As will be seen on referring to FIG. 1 a core 1 comprising a polythene insulated conductor or a group of polythene insulated conductors and a metal foil tape 2 having a coating of polythene on each of its sides are advanced in the direction of their length successively through a unit 3 for centralising the tape with respect to the core, through a folding die 4 comprising a series of mutually spaced apertured plates for folding the tape transversely to its length to embrace the cable core with its edges in overlapping relationship, under a device 5 for obtaining by the method of the present invention a bond between the longitudinally advancing overlapping strips of the tape, and thence through an extruder 6 for applying an outer polythene sheath to the longitudinally taped cable core.

The bonding device 5 shown in FIGS. 2, 3 and 4 comprises a die 10 having a die surface 11 of substantially arcuate form whose radius of curvature is greater than the external radius of curvature of the taped core. The die 10 is secured by a bolt 14 to the undersurface of an adapter plate 12 projecting transversely from the lower end of a vertically extending support arm 15 which is constrained to move in a vertical direction with respect to fixed ball bushes 16 by an anti-rotational guide 17 engaging in a vertical extending recess 19 in a support frame 18. The support arm 15, which carries at its upper end a spring loaded handle 20 for raising the die from the tape-enveloped core, is urged towards the taped core passing thereunder by a coil spring 22. When in the raised position the arm 15 can be rotated through 90° so that the handle 20 engages the upper edge of the frame 18 to maintain the die 10 clear of the tape-enveloped core. The angle which the arcuate surface of the die subtends will normally depend upon the diameter of the tape-enveloped core. For cores of small diameter the angle may approximate to 180°.

The die 10 has two sets of ports extending through the wall of the die and opening into the lower surface 11 of the die at places directly over the overlapping strips of the tape 2. One set of ports 25 extends from a cavity 26 in the adapter plate 12 above the entry portion of the die 10 and serves to project hot air under superatmospheric pressure into the upstream portion of the die to heat the overlapping strips of the tape 2, the hot air being fed to the cavity 26 from a heater 30 via a pipe 29 (FIG. 1). Another set of ports 32 extends from a cavity 33 in the adapter plate 12 above the exit end of the die 10 and serves to project cold air under pressure from a supply pipe 35 into the downstream portion of the die to accelerate solidification of the softened material between the overlapping strips of the tape 2. The set of ports 25 and the set of ports 32 each comprises three ports mutually spaced along the length of its respective portion of the die 10 and the three ports are also arcuately spaced about the arcuate surface of the die. Each port 25 and 32 is inclined at approximately 15° to the vertical plane containing the longitudinal axis of the die so that the flow of hot and cold air, respectively, moves over the top overlapping portion of tape in the direction of overlap. Such inclination of the ports 25 and 32 has the action of evacuating air from between the overlapped strips of the tape 2 and assists in pressing them together to promote bonding. The upstream portion of the die 10 is also provided with a port 36 of smaller diameter which opens into the flared entry end of the die and which is located in the vertical plane containing the die axis and inclined at an angle of approximately 60° to the die axis so as to give the emergent stream of hot air a component of movement opposite to the direction of travel of the tape-enveloped core. Both the hot air directed into the upstream portion of the die through the ports 25 and the cold air directed into the downstream portion of the die through the ports 32 act as a lubricant between the tape-enveloped core and the undersurface 11 of the die thereby eliminating any tendency for the polythene coating on the external surface of the folded tape to be stripped off.

The temperature of the gaseous fluid, usually air, required to effect a bond in accordance with our invention will naturally depend primarily upon the softening point of the thermoplastic material with which the metal foil tape 2 is coated. Where, as in the example being described this is polythene having a heat distortion temperature of 105° C. (Method ASTM D648) we prefer to use air at a temperature of 650° C. and, for bonding overlapping longitudinally extending strips only, to feed the hot air to the underface of the die 10 through circular section ports 25 of 3/32 in. (2.38 mm.) diameter at a pressure of 30 p.s.i. (2.11 kgm./cm.²) using a die 2½ in. (6.35 cm.) in length and having, for a taped core of 1 in. (2.54 cm.) diameter, a radius of curvature of $D/2+0.040$ in. ($D/2+0.102$ cm.) where D is the diameter of the core, the radial clearance maintained between the tape-enveloped core and the undersurface 11 of the die being at least 0.015 in. (0.38 mm.). The circular section ports 32 through which air at or below room temperature is fed to the downstream portion of the die 10 are also each of 3/32 in. (2.38 mm.) diameter, the cold air being supplied at a pressure of 35 p.s.i. (2.45 kgm./cm.²).

Figure 6:
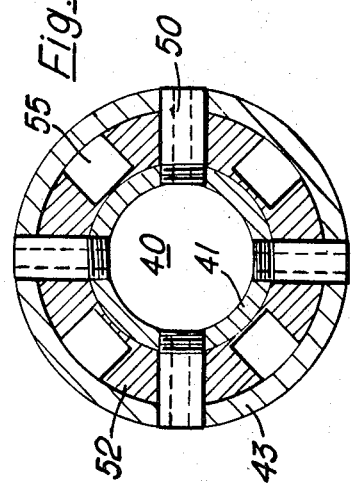
FIG. 6 is a fragmental view taken on the line VI—VI in FIG. 5.

The heater 30 which is employed in heating the air that is fed into the upstream portion of the die 10 is shown in FIGS. 5 and 6 and comprises three concentrically arranged tubes 41, 43 and 45 defining a central bore 40 and annular spaces 42 and 44. In the inner annular space 42 there is located a coiled heating element 47 which is capable of heating 0.69 lb./min. (0.313 kgm./min.) of air at between 10 p.s.i. and 40 p.s.i. (0.703 and 2.812 kgm./sq. cm.) to a temperature lying within the range 600°–800° C. Air at room temperature is fed through an end cap 48 at the entry end of the heater 30 into the outer annular space 44. The air travels down the length of the annular space 44, which is closed at its other end by an end cap 49, and then inwardly through four radial passages 50 extending from the annular space 44 to the central bore 40 which is closed at the inlet end of the heater 30 by an end plate 51 and at the outlet end of the heater by an end plate 52. The air 2 travels along the length of the central bore 40 in the opposite longitudinal direction to that in the outer annular space 44 until it reaches the inlet end of the heater 30 where it flows radially outwardly through ports 54 in the inner tube 41 into the inner annular space 42. From the ports 54 the air travels around the coils of the heater element 47 towards the outlet end of the heater where the hot air flows through longitudinally extending passages 55 in the end plate 52 and out through a central aperture in the end cap 49 and thence to the die 10.

By the present invention it is possible to provide a cable core with a tight-fitting longitudinally applied and longitudinally seamed metal foil envelope, using for the envelope a metal foil tape coated on one side only with a thermoplastic material. Naturally a stronger seam can be more readily obtained by using a double coated metal foil since the seam is obtained by making a plastics to plastics bond, whereas in the former case a seam is obtained by making a plastics to metal seam.

What I claim as my invention is:

1. In a method of forming about a cable core a tubular conductor by drawing a thermoplastics coated metal foil tape and the cable core through a tape-folding device which bends the tape transversely to its length to embrace the cable core, the step of obtaining a bond between a longitudinally extending strip of the folded tape and an underlying surface, which step comprises simultaneously heating and pressing together the overlying strip and underlying surface by maintaining a film of a hot gaseous fluid under superatmospheric pressure in contact with at least that part of the outer surface of the strip of the coated metal foil tape that overlies and makes contact with the underlying surface for a period of time sufficient for the thermoplastic material between the strip and the underlying surface to become sufficiently softened to enable the required bond to be effected.

2. In a method of forming about a cable core a tubular conductor by drawing a thermoplastics coated metal foil tape and the cable core through a tape-folding device which bends the tape transversely to its length to embrace the cable core, the step of obtaining a bond between a longitudinally extending strip of the folded tape and an underlying surface, which step comprises causing the tape-enveloped cable core to travel past a die and simultaneously heating and pressing together the overlying strip and underlying surface by feeding hot gaseous fluid under superatmospheric pressure into a clearance between at least that part of the outer surface of the strip of the coated metal foil tape that overlies and makes contact with the underlying surface and the wall of the die for a period of time sufficient for the thermoplastic material between the strip and the underlying surface to become sufficiently softened to enable the required bond to be effected.

3. In a method of forming about a cable core a tubular conductor by drawing a thermoplastic coated metal foil tape and the cable core through a tape-folding device which bends the tape transversely to its length to embrace the cable core, the step of obtaining a bond between a longitudinally extending strip of the folded tape and an underlying surface, which step comprises causing the tape-enveloped cable core to travel past a die and simultaneously heating and pressing together the overlying strip and underlying surface by feeding a hot gaseous fluid under superatmospheric pressure into a clearance between at least that part of the outer surface of the strip of the coated metal foil tape that overlies and makes contact with the underlying surface and the wall of the die for a period of time sufficient for the thermoplastic material between the strip and the underlying surface to become sufficiently softened to enable the required bond to be effected, and accelerating solidification of the softened thermoplastic material by feeding into the clearance of a downstream portion of the bonding die a cold gaseous fluid under pressure which solidifies the thermoplastic material of the bond.

4. A method as claimed in claim 3, in which the overlapping margins of the longitudinally applied thermoplastics coated metal foil tape are seam welded together, wherein at least the overlapping margins of the advancing tape enveloped core are caused to travel past a die having a die surface of substantially arcuate form, which die is so supported that it is urged towards the overlapping margins but is maintained in spaced relationship thereto by the gaseous fluids.

5. A method as claimed in claim 4, wherein the arcuately shaped die is mounted above the advancing core and is urged downwardly by spring pressure.

6. For use in a method of forming about a cable core a tubular conductor by drawing a thermoplastics coated metal foil tape and the cable core through a tape-folding device which bends the tape transversely to its length to embrace the cable core, apparatus for obtaining a bond between a longitudinally extending strip of the folded tape and an underlying surface, which apparatus comprises a die past which the tape enveloped core is adapted to travel, the die having at least one port which extends through the die wall and opens into the surface of the die that will be adjacent that part of the outer surface of the strip of the coated metal foil tape that overlies and makes contact with the underlying surface, and means for feeding a hot gaseous fluid under superatmospheric pressure through the die port and into contact with said part of the outer surface of the strip of the coated metal foil tape.

7. For use in a method of forming about a cable core a tubular conductor by drawing a thermoplastics coated metal foil tape and the cable core through a tape-folding device which bends the tape transversely to its length to embrace the cable core, apparatus for obtaining a bond between a longitudinally extending strip of the folded tape and an underlying surface, which apparatus comprises a die past which the tape-enveloped core is adapted to travel, the die having at least two ports which are longitudinally spaced along and extend through the wall of the die and open into the surface of the die that will be adjacent that part of the outer surface of the strip of the coated metal foil tape that overlies and makes contact with the underlying surface, means for feeding a hot gaseous fluid under superatmospheric pressure through the port in the upstream portion of the die and into contact with said part of the outer surface of the strip of the coated metal foil tape, and means for feeding a cold gaseous fluid under pressure through the port in the downstream portion of the die and into contact with said part of the outer surface of the strip.

8. Apparatus as claimed in claim 7, wherein the die has a die surface of substantially arcuate form past which overlapping margins of the tape of a tape-enveloped core are adapted to travel, the die being so supported that it is urged towards the overlapping margins of the tape.

9. Apparatus as claimed in claim 8, wherein each port is inclined to the inward radial direction in such a manner that the flow of fluid moves over the top overlapping portion of tape in the direction of overlap.

10. Apparatus as claimed in claim 8, wherein the die is so supported that it will lie above a longitudinally advancing tape enveloped core and is urged downwardly by spring pressure.

11. Apparatus as claimed in claim 7, wherein the die has two separate sets of ports mutually spaced along its length and located adjacent that part of the outer surface of the strip of the coated metal foil tape that overlies the underlying surface, one set for the introduction of the hot gaseous fluid and the other set for the introduction of the cold gaseous fluid, the ports of each set comprising at least two arcuately spaced ports.

12. Apparatus as claimed in claim 7, wherein the die is of tubular form and has at least two longitudinally spaced rings of ports around its circumference.

13. Apparatus as claimed in claim 7, wherein an additional port is provided at the entry end of the die inclined to the axis of the die so as to give the emergent stream of hot gaseous fluid a component of movement opposite to the direction of travel of the tape-enveloped core.

References Cited
UNITED STATES PATENTS

| | | | |
|---|---|---|---|
| 3,206,541 | 9/1965 | Jachimowicz | 174—105 |
| 3,321,572 | 5/1967 | Garner | 174—105 |
| 3,332,128 | 7/1967 | Garner | 156—54 |
| 3,485,689 | 12/1969 | Polizzano | 156—54 |

VERLIN R. PENDEGRASS, Primary Examiner